Figure 5:
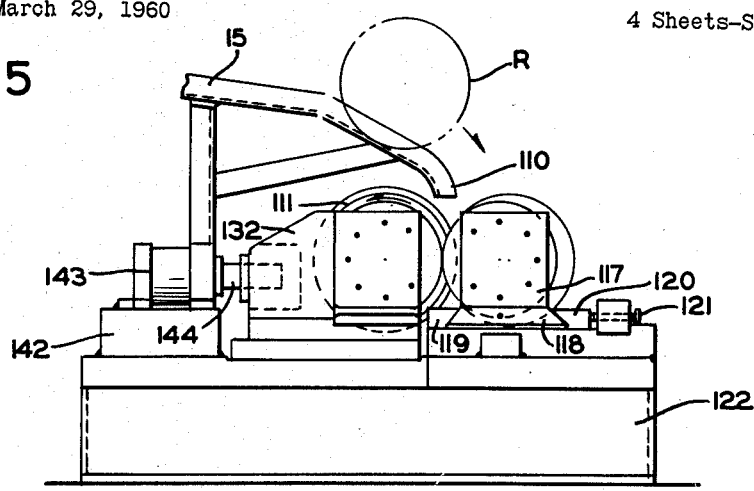

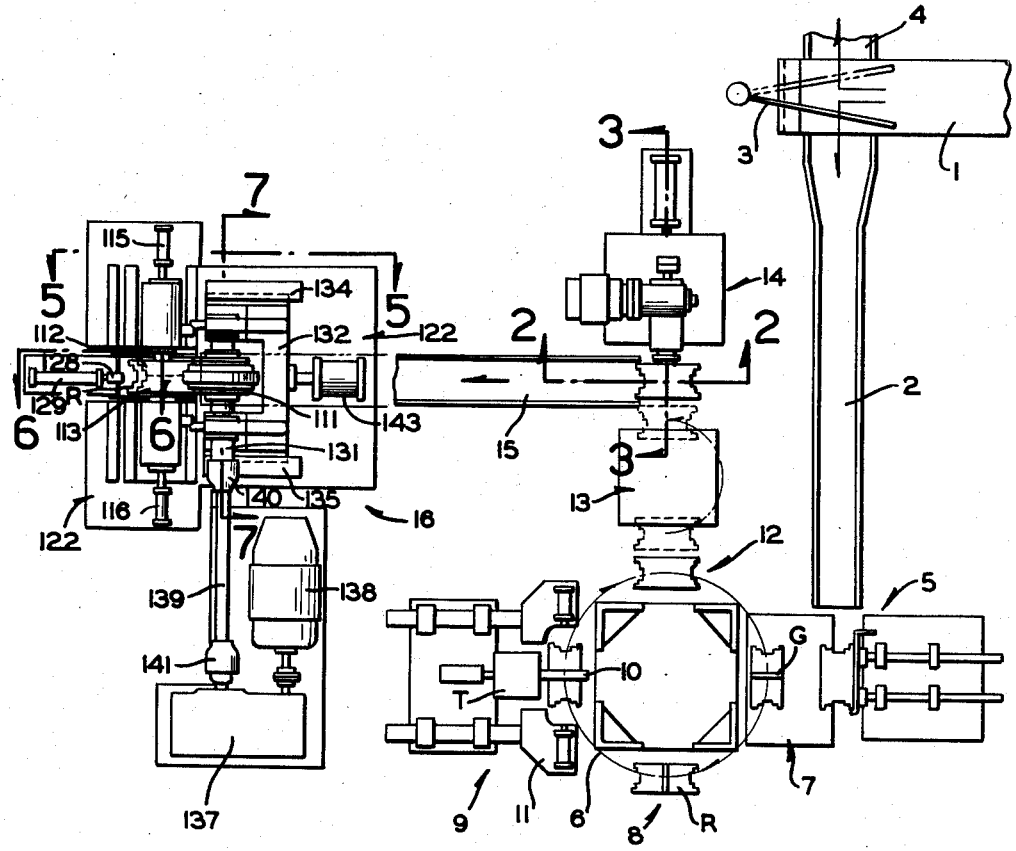

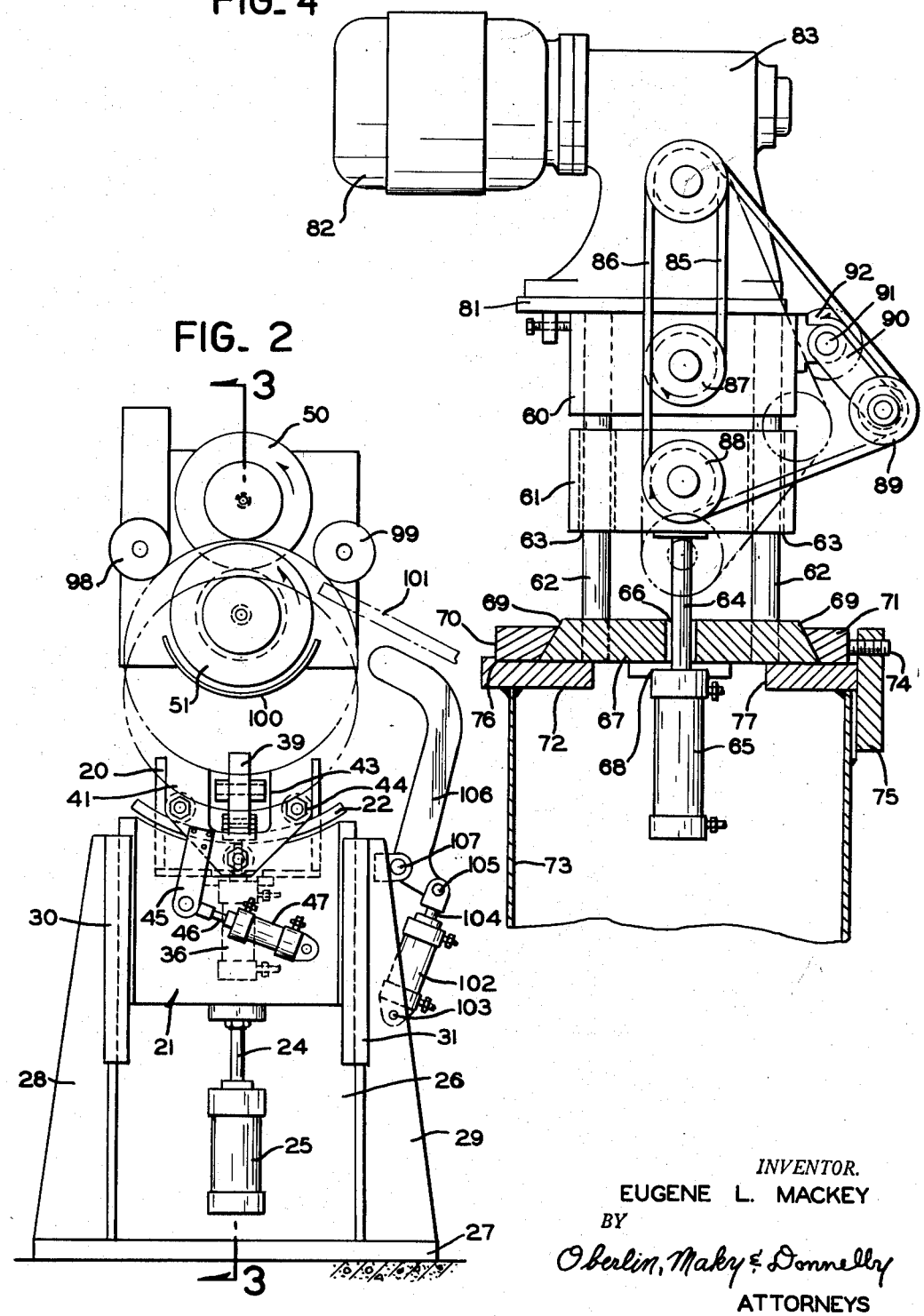

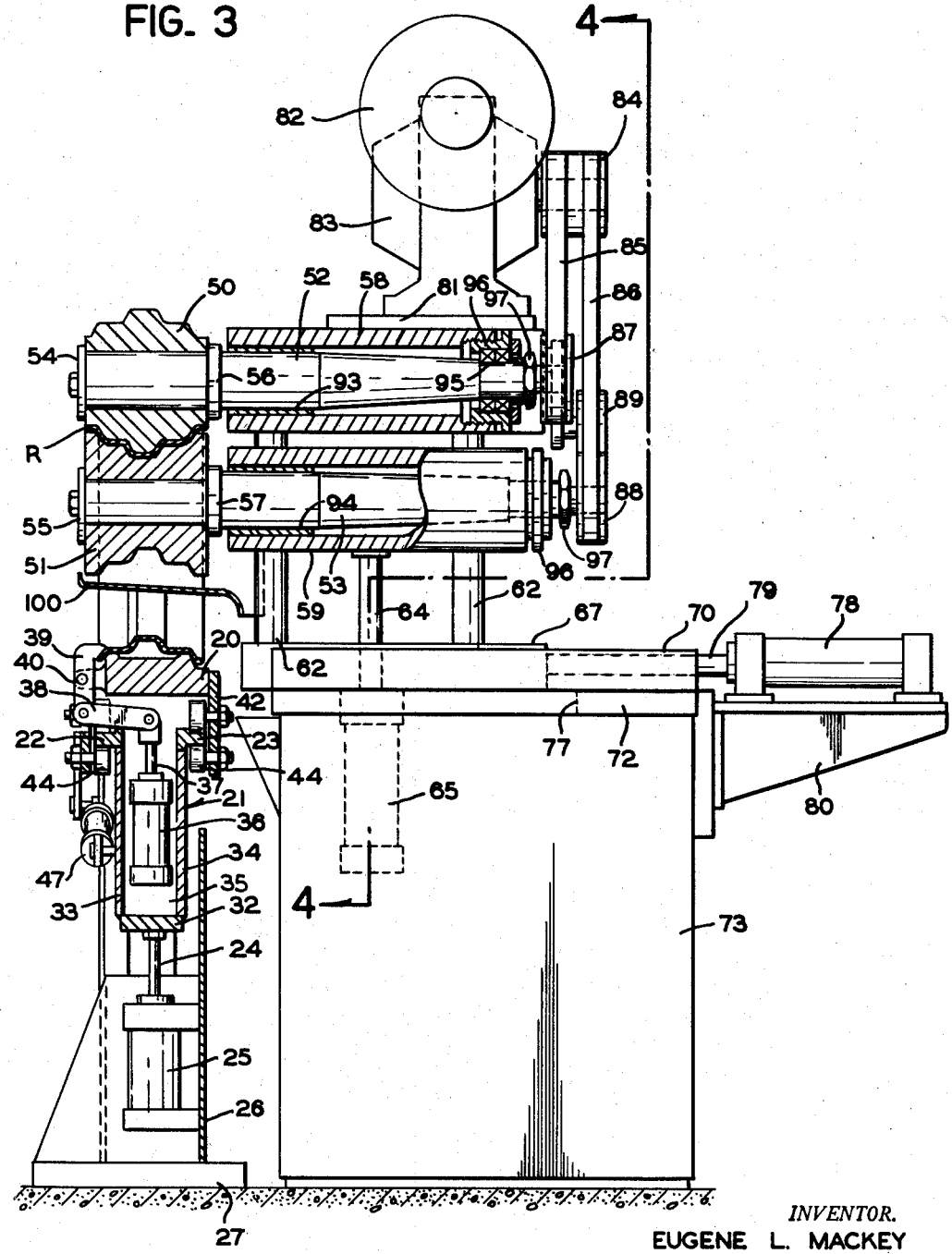

July 16, 1963    E. L. MACKEY    3,097,570
RING FINISHING APPARATUS
Filed March 29, 1960    4 Sheets-Sheet 4

INVENTOR.
EUGENE L. MACKEY
BY
Oberlin, Maky & Donnelly
ATTORNEYS

United States Patent Office 3,097,570
Patented July 16, 1963

3,097,570
RING FINISHING APPARATUS
Eugene L. Mackey, Fairview Park, Ohio, assignor to The Yoder Company, Cleveland Ohio, a corporation of Ohio
Filed Mar. 29, 1960, Ser. No. 18,359
5 Claims. (Cl. 90—16)

This invention relates generally, as indicated, to ring finishing apparatus and more particularly to milling and planishing apparatus for finishing drop-center automobile wheel rims especially designed for use in conjunction with the apparatus disclosed in my co-pending application Serial No. 18,430, entitled "Ring Processing Method and Apparatus," filed even date herewith.

In the American automobile industry, the introduction of the smaller car and automobiles having smaller wheels and tubeless tires has necessitated provision of means accurately and quickly to form drop-center wheel rims that will both effectively withstand high rotational speed stresses and shocks of high speed automatic travel and also provide a perfectly airtight inner core for such small tubeless tires. Uniformity of the quality of the rim produced is important in that each rim cannot readily be minutely inspected for slight variations in size or balance. Excessive variations in size will, of course, result in an improper mating between the tire and the rim and a wheel out of balance can be destroyed by excessive rotational speeds. Accordingly, apparatus that will quickly yet uniformly finish drop-center wheel rims to proper size and balance is highly to be desired.

The apparatus of this invention is designed for employment in conjunction with a process for making such wheel rims in which the rim is welded in circular form after the stock has been formed and circularized. The welding of the gap in the ring leaves a slight bead on both the interior and exterior of the ring which must be removed properly to balance the wheel rim, and then the rim must be subjected to a sizing operation to produce a uniform finished article. In order to produce such rims economically and uniformly, the apparatus must be capable of operation with great accuracy at high speeds.

With the foregoing in mind, it is a primary object of this invention to provide apparatus which will quickly and effectively remove a weld bead from a circular object, such as a drop-center rim and then subject the same to a final finishing and sizing operation.

It is yet another important object of my invention to provide finishing and sizing apparatus which can be used in conjunction with ring forming and closing apparatus accurately and economically to produce small diameter drop-center automobile rims.

It is a further object to provide ring finishing apparatus which is readily adapted to completely automatic high speed operation.

Another object is to provide a machine for finishing such drop-center wheel rims and the like at a very rapid rate with fewer pieces of apparatus occupying less floor space and utilizing fewer man hours than conventionally required.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

Figure 6:
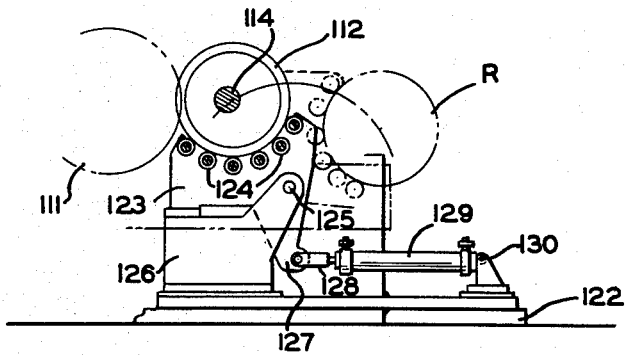
Figure 7:
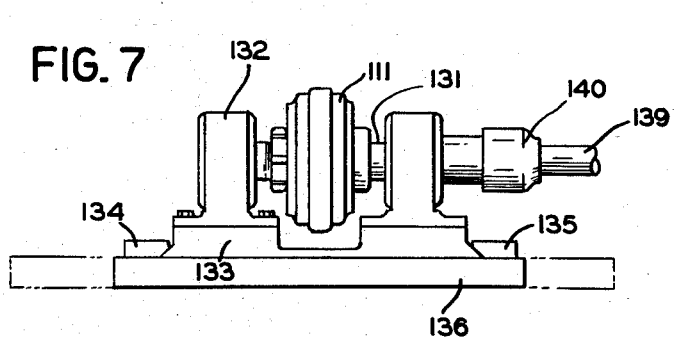

In said annexed drawings:
FIG. 1 constitutes a single schematic plan of my invention illustrating the layout of the various machines employed in conjunction therewith;
FIG. 2 is an elevational view of my ring milling apparatus taken substantially on the line 2—2 of FIG. 1;
FIG. 3 is a view partially in section of such ring milling apparatus taken substantially on the lines 3—3 of FIGS. 1 and 2;
FIG. 4 is an elevation partially in section taken substantially on the line 4—4 of FIG. 3;
FIG. 5 is a fragmentary elevation of my planishing apparatus taken substantially on the line 5—5 of FIG. 1;
FIG. 6 is a fragmentary elevation of my ring supporting and ejecting apparatus taken substantially on the line 6—6 of FIG. 1; and
FIG. 7 is a fragmentary elevation taken substantially on the line 7—7 of FIG. 1 illustrating the profile of one of my planishing rolls.

Referring now to said annexed drawings and more particularly to FIG. 1, there is illustrated the layout of machines for taking coiled stock and economically and uniformly closing such stock into a homogeneous ring and subsequently finishing and sizing such ring. The coiled stock may be formed from flat steel strip in a suitable coiling and cutoff mechanism such as that shown in the co-pending application of Todoran et al., Serial No. 745,869 entitled "Ring Coiling and Cut-Off Machine," filed July 1, 1958. In such machine, the stock is coiled to produce a circularized ring in which the ends are closely spaced apart forming a slight gap therebetween. The rings may be fed from the forming machine to the closing and finishing apparatus illustrated in FIG. 1 on a suitable conveyor 1. The rings are discharged onto a ramp 2 by an escapement type gate 3. A ramp 4 may be provided leading to a duplicate of the apparatus about to be described.

From the ramp 2, the rings are fed as by gravity to an orientation station 5 in which the rings are rotated to position the gap G therein in the proper oriented position, this preferably being at the top center of the ring. From the orientation station, the rings are transferred to an index table 6 with the assistance of a loading station 7. With the rings properly in position, toggle clamping devices may be employed firmly clamping the ring R to the index table in its thus oriented position. The table is then indexed in a clockwise direction through successive 90° arcs to a ring cleaning station 8 and to a gap closing or welding station 9. Here, welding shoes 10 are brought into contact with the edges of the gap G and a forging platten 11 is positioned to exert a forging pressure on the clamps which are spaced slightly from the gap G. A transformer T is employed to supply the proper welding current. At the next station 12, the rings are unloaded by mechanism 13 to be placed on my ring milling apparatus 14. After the weld bead has been removed from the ring, it is conveyed by means of ramp 15 to my final finishing and sizing station 16.

The ring milling and finishing apparatus embodied in stations 14 and 16 constitutes the apparatus of my present invention. In such apparatus, the ring closing and finishing machines, such as have just been described, can operate at a speed about half that of the ring forming apparatus. Accordingly, in order economically to handle the output of the forming machine, such apparatus must be duplicated to obtain the proper production ratios.

*The Ring Milling Mechanism-Supporting Structure*

Referring now additionally to FIGS. 2, 3 and 4, it will be seen that the unloading mechanism 13 will place the ring directly over a support 20 which is mounted for vertical movement on slide 21 and for arcuate pivoting movement on spaced rails 22 and 23. The support 20 is moved vertically by means of rod 24 of cylinder 25 attached to slide 21. The cylinder 25 is mounted on upstanding base plate 26 which is in turn mounted on bed plate 27. Also mounted on bed plate 27 are two upstanding supports 28 and 29 having retainers 30 and 31 confining the slide 21 to its proper vertical direction.

The slide 21 includes a bottom wall and front and back walls 33 and 34 respectively forming a hollow center portion or chamber 35. This hollow portion accommodates cylinder 36 carried by support 20 for movement therewith. The rod 37 of the cylinder 36 is pivotally connected to the end of link 38 which is in turn pivotally distally connected to clamping link 39, such link 39 being intermediately pivotally mounted on the support 20 at 40. In this manner, it can readily be seen that the ring R may be firmly secured on the support 20 by the proper sequence of actuation of cylinders 25 and 36. After the ring has been placed directly over the support 20 by the unloading mechanism, the cylinder 25 will be actuated to raise the support 20 into contact with the ring R as shown. Once this is accomplished, the actuation of cylinder 36 will swing the clamping link toward support 20 firmly to hold the ring between such link and the top of such support.

Depending from the front and rear of the support 20 are plates 41 and 42, the plate 41 being recessed as at 43 to accommodate the movement of clamping link 39. Secured to each plate 41 and 42 are three rollers 44, each plate having two widely spaced rollers positioned to ride on top of each of the rails 22 and 23 as well as a single roller positioned to ride beneath such rails. Accordingly, the support 20 is firmly secured to the slide 21 and yet pivotal along an arc the center of which is the center of curvature of the rails 22 and 23. Fixedly secured to the front plate 41 is an arm 45 to which the rod 46 of cylinder 47 is pivotally secured, the blind end of cylinder 47 being pivotally secured to plate 33. Since the arm is fixed as by rivets to the pivotal support 20, it can readily be seen that the extension of rod 46 of cylinder 47 will rock the support 20 and, of course, the ring R clamped thereto through a prescribed arc, preferably an arc having as its center the center of the ring in its uppermost position. Thus the ring will be axially pivoted or oscillated by cylinder 47. It can now be seen that the support structure for the ring while in my welding station includes three actuating cylinders 25, 36 and 47 to control the movements of the ring with respect to the milling cutters now to be described.

*The Cutters*

The top cutter 50 and bottom cutter 51 are mounted on their respective spindles 52 and 53 of the configuration shown. These cutters may be secured on such spindles by mounting plates 54 and 55 respectively clamping such cutters against collars 56 and 57. Each of the spindles is mounted within separate housings 58 and 59 each having spaced pairs of chocks 60 and 61 (FIG. 4). Chocks 61 are mounted for vertical reciprocation on spaced supports 62, there being four such supports passing through respective openings 63 in the chocks 61. Centrally secured to the bottom of housing 59 is the rod 64 of cylinder 65. The rod freely passes through opening 66 in base plate 67 and the cylinder 65 is firmly fastened to the bottom of such base plate as at 68. The base plate has sloping sides 69 cooperating with guides 70 and 71 overlying such sides. Both the plate 67 and the guides 70 and 71 are mounted on support or bed plate 72 which is in turn mounted on stand or base 73. The pressure of the guides 70 and 71 against the slide plate 67 is controlled by a screw 74 mounted in plate 75 secured to the side of stand 73. In this manner, the pressure of the guide 71 against the plate 67 may be controlled, it being noted that guide 70 is fitted within shoulder 76 of the bed plate 72. The proper adjustment of screw 74 will result in the sliding base plate 67 being firmly secured to the base 73 and yet readily slidable horizontally. The plate 72 has an elongated cutout portion 77 to accommodate such horizontal movement of cylinder 65, such movement being accomplished by cylinder 78 having rod 79 secured to such sliding plate. The cylinder 78 is mounted on extension 80 projecting from the rear of the stand 73.

Supported on top of the guides 62 is a motor mounting plate 81 supporting motor 82 and transmission 83 driving dual sheave 84 having belts 85 and 86 trained thereabout. Belt 85 drives pulley 87 and hence spindle 52 while belt 86 drives lower spindle 53 through sheave 88. A sheave 89 mounted on arm 90 is employed to maintain the belt 86 at the proper tension during vertical movement of the spindle 53. Arm 90 is keyed to shaft 91 of a pneumatic rotary cylinder 92 under constant pressure tending to rotate the shaft 91 in the direction of the arrow shown in FIG. 4. It will readily be seen that the movement of the sheave 88 to its lowermost position will draw the belt tightening sheave 89 to the position shown in phantom lines in FIG. 4. Thus the belt 86 is maintained under a proper driving tension.

The spindles 52 and 53 have respective sleeve bearings or bushings 93 and 94 at the drive end thereof and spaced roller bearings 95 at the driven end thereof. The bearings are retained on the respective spindles by retainers 96 threaded in the spindle housing and nuts 97 secured to the spindles. In this manner, the motor 82 will drive the cutters through the belt-sheave drive rotating the spindles and hence the cutters at the proper r.p.m. It is noted that the threaded retainers 96 permit axial adjustment of the spindles 52 and 53 whereby the cutters may be properly vertically aligned. Idler rolls 98 and 99 (FIG. 2) are employed in connection with the upper cutter 50 mounted on the upper housing 58 to assist in the proper nesting of the ring R against such cutter 50. Chip clearance chutes 100 and 101 are also provided to facilitate the removal of the chips from the machine, the chute 100 being mounted for movement with the lower cutter 51.

It can now be seen that the cutters 50 and 51 are mounted for horizontal axial reciprocation by actuation of cylinder 78, the rod 79 of which is secured to the slide 67. The lower cutter 51 is mounted for vertical reciprocation with respect to the cutter 50 by actuation of the cylinder 65, the rod 64 of which is secured to the lower spindle housing 59.

As shown in FIG. 2, the blind end of a cylinder 102 is pivoted as at 103 to upstanding support 29 on base 27. The rod 104 of this cylinder is pivoted at 105 to an L-shape kickoff arm 106. This arm is also pivoted to support 29 as at 107. It can readily be seen that actuation of cylinder 102 will extend rod 104 to pivot the arm about pivot 107 to kick the ring R from the support 20 after clamp 39 has been released. The ring R will then be kicked onto ramp 15 to roll down onto the planishing and sizing station now to be described.

*The Planishing and Sizing Mechanism*

Referring now more particularly to FIGS. 1, 5, 6 and 7 it will be seen that ramp 15 has a curved end 110 passing over outside pressing roll 111 to position the ring substantially coaxially with rolls 112 and 113 on aligned axially reciprocable shafts. Roll 112 is mounted on shaft 114 which is in turn mounted for reciprocation by cylinder 115 and the shaft of roll 113 is similarly reciprocated by cylinder 116. As shown in FIG. 5, each such shaft is mounted in a housing or bearing 117 which is in turn mounted on slide 118 secured between guides 119 and 120, the pressure of such guides being controlled by screw 121. The guides and slide are in turn mounted on base structure 122.

Positioned beneath the rolls 112 and 113 is a support 123 having arcuately arranged thereon a series of support rolls 124 forming a bed or supporting device for the ring R as it rolls from the end 110 of the ramp 15, it being understood that the rolls 112 and 113 will be laterally withdrawn at the time the ring R rolls therebetween. The support 123 is pivotally mounted as at 125 on an ear of base member 126. Support 123 has a depending portion 127 having clevis 128 secured thereto which is in turn connected to the rod of cylinder 129. The blind end of this cylinder is pivoted as at 130 to the base 122. Actuation of the cylinder 129 will extend the clevis to pivot the support 123 to the position shown in phantom lines to eject the ring R from the planishing station after the sizing operation is complete. As shown in FIGS. 1, 5 and 7, the external planishing or pressing roll 111 is mounted on shaft 131 carried by yoke 132. The yoke includes sliding plate 133 secured between guides 134 and 135 mounted on base member 136 which is in turn mounted on base 122. The shaft 131 of the roll 111 is driven through transmission 137 (FIG. 1) by motor 138. A drive spindle 139 having universal joints 140 and 141 accommodating movement of the roll 111 is employed to drive the shaft 131 from the transmission 137.

Mounted to the rear of base 122 on support 142 is a hydraulic cylinder 143, the rod 144 of which is connected to the bight portion of yoke 132. This cylinder operated under extremely high pressures is employed to press the ring R firmly between the pressing roll 111 and the internal rolls 112 and 133. It will be seen that the ring will roll down the ramp to be positioned on the arcuate bed formed by rolls 124 between the separated internal rolls 112 and 113. When these rolls come together, they will form a support or mandrel for the interior of the ring which will be confined by the arcuately disposed rolls 124 and the now closed internal rolls or mandrel. After the internal rolls have closed, the cylinder 143 will be actuated to move the roll 111 against the outside of the ring. The high pressures obtained by cylinder 143 and the rapid rotation of the roll 111 by motor 138 will be sufficient to planish and size the ring R in a very short interval.

*Operation*

The ring R is placed above the support 20 with the welded gap in the uppermost position. This may, of course, be done manually or preferably by the mechanical handling apparatus shown in FIG. 1. At this time the cylinder 25 will be retracted such that the support 20 is in its lowermost position and the cylinder 36 will also be retracted having pivoted the clamping link 39 away from the support 20. Also at this time, the cylinder 65 will be retracted such that the cutter 51 is positioned so that the ring R may be placed therearound. After the ring is placed above the support 20, cylinder 25 is extended to raise the support beneath the ring, tripping in its course two limit switches (not shown) to actuate cylinders 36 and 65. Cylinder 36 is now extended clamping the ring on support 20 and cylinder 65 also is extended to position the cutters in the relative position to the ring shown in FIG. 3, the ring having been placed in nested position against rolls 98, 99 and cutter 50 by cylinder 25. The pressure in cylinders 65 and 25 will be such to maintain the proper cutting pressure between the cutters 50 and 51. Both cutters 50 and 51 are rotating as the result of energization of motor 82 which may be separately manually controlled. Once the cutters and ring are in the relative position shown in FIG. 3, cylinder 47 will be actuated to pivot support 20 completely to mill the weld bead from the ring. The extension of the rod 46 of cylinder 47 may actuate a limit switch (not shown) retracting cylinder 47 after a brief time delay to its original position. As soon as the pivoting operation is complete, a limit switch (not shown) will retract first cylinder 65 and then cylinder 25 to their original lower positions in which the cutters are vertically clear of the channel or drop-center in the ring R. At this position, cylinder 78 is retracted moving both of the cutters 50 and 51 to the right as shown in FIG. 3 to a position laterally clear of ramp 15. At this retracted position, cylinder 36 is retracted releasing clamping link 39. Now cylinder 102 is extended, actuating kickoff 106 to place the ring R on ramp 15. After the ring is removed from the milling apparatus, the cylinder 78 is extended to position the cutters again to receive the next ring and resetting the milling apparatus for the next cycle.

The ring may roll down ramp 15 gravitationally to be nested in the arcuate bed of support rollers 124. When so positioned, a limit switch will extend cylinders 115 and 116 placing the rolls 112 and 113 within the ring to form the complete interior planishing roll. Energization of motor 138 will rotate outside planishing roll 111 and the extension of high pressure hydraulic cylinder 143 will now force the roll 111 pressing the ring R against the interior rolls 112 and 113. The pressure and high speed rotation of roll 111 will planish and size the ring R after a very short interval. A suitable time delay device will cause retraction of cylinder 143 as well as cylinders 115 and 116 and then actuation of cylinder 129 will pivot support 123 to eject the finished ring R as shown in FIG. 6.

It can now be seen that I have provided apparatus which will take unfinished rings, such as rings having weld beads thereon, and completely remove the weld bead as well as planish and size such ring such that it may readily be secured to a conventional spider to form a complete automobile wheel rim. It is noted that the configuration of the cutters 50 and 51 as well as the interior and exterior planishing rolls is such as to conform to the drop-center configuration of the ring R. In this manner, a small diameter wheel rim which is completely homogeneous is rapidly and quickly formed using apparatus which is susceptible of completely automatic operation, examples of controls adaptable for use with such mechanism being found in my aforementioned copending application "Ring Processing Method and Apparatus." Moreover, with the apparatus illustrated, there is a minimum loss of material due to waste and a minimum amount of floor space is required.

Other modes of applying the principle of the invention may be employed, change being made as regards the details described, provided the features stated in any of the following claims or the equivalent of such be employed.

I, therefore, particularly point out and distinctly claim as my invention:

1. The method of removing a weld bead from a ring or the like comprising the steps of placing such ring with the bead thereof in engagement with an external bead removing device, placing an internal bead removing device in engagement with such bead, said bead removing devices being in the same plane normal to the axis of such ring, and pivoting such ring about a fixed axis effectively to remove such bead.

2. In apparatus for finishing a drop-center wheel rim; a support mounted for vertical reciprocation, means to clamp such rim to said support, an external milling cutter, means to raise said support with such rim thereon to place such rim against said external cutter, an internal cutter mounted for vertical reciprocation with respect to said external cutter, means to raise said internal cutter to place said cutter against such rim subjacent said external cutter, means to pivot said support to oscillate such rim about a fixed axis, means to separate said external and internal cutter a distance sufficient axially to clear the drop-center of such rim, means axially to withdraw both said cutters and means to transfer such rim from said support to a planishing and sizing station.

3. Apparatus as set forth in claim 2 including means to form an internal planishing roll within such rim, an external pressure roll mounted for movement toward and away from such rim, means to rotate such pressure roll, and means forcibly to apply said roll to the external surface of such rim effectively to planish and size such rim.

4. Apparatus as set forth in claim 3 wherein said pressure roll is mounted on a yoke, the bight portion of which is connected to the rod of a high pressure hydraulic cylinder.

5. Apparatus for removing a weld bead from a drop-center wheel rim comprising a vertically reciprocable support, means to position such rim on said vertically reciprocable support in weld bead oriented position, means to clamp such rim to said support in such weld bead oriented position, a cutter positioned externally of such rim, means to raise said support and therefore such rim to a position wherein such bead is adjacent said external cutter, a cutter positioned internally of such rim, means to raise such cutter subjacent said external cutter, means to move said support to pivot such rim effectively about a fixed axis to remove such weld bead, means to separate said cutters and lower said support a distance sufficient for said cutters axially to clear the drop-center of such rim, means axially to withdraw such cutters, and means laterally to remove such rim from the apparatus.

References Cited in the file of this patent

UNITED STATES PATENTS

| | | |
|---|---|---|
| 1,117,663 | Gressle | Nov. 17, 1914 |
| 1,518,283 | Theberath | Dec. 9, 1924 |
| 1,670,136 | Bush | May 15, 1928 |
| 1,681,070 | Uschmann | Aug. 14, 1928 |
| 1,975,939 | Grotnes | Oct. 9, 1934 |

FOREIGN PATENTS

| | | |
|---|---|---|
| 3,770 | Great Britain | 1913 |
| 94,425 | Germany | Nov. 1, 1897 |
| 932,215 | Germany | Aug. 25, 1955 |